(12) United States Patent
Krishnamoorthy et al.

(10) Patent No.: US 11,327,981 B2
(45) Date of Patent: May 10, 2022

(54) GUIDED SAMPLING FOR IMPROVED QUALITY TESTING

(71) Applicant: BANK OF AMERICA CORPORATION, Charlotte, NC (US)

(72) Inventors: Madhusudhanan Krishnamoorthy, Chennai (IN); Rajasekhar Reddy Patlolla, Telangana (IN); Shilpi Prashant Choudhari, Telangana (IN); Thenamudhan Arumugasamy, Chennai (IN); Giddaiah Kummari, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 7 days.

(21) Appl. No.: 16/940,678

(22) Filed: Jul. 28, 2020

(65) Prior Publication Data
US 2022/0035824 A1 Feb. 3, 2022

(51) Int. Cl.
| | |
|---|---|
| G06F 16/00 | (2019.01) |
| G06F 16/2457 | (2019.01) |
| G06F 9/46 | (2006.01) |
| G06F 16/21 | (2019.01) |
| G06N 20/00 | (2019.01) |

(52) U.S. Cl.
CPC ........ *G06F 16/24578* (2019.01); *G06F 9/466* (2013.01); *G06F 16/219* (2019.01); *G06N 20/00* (2019.01)

(58) Field of Classification Search
CPC ................................................ G06F 16/24578
USPC ........................................................ 707/723
See application file for complete search history.

(56) References Cited

U.S. PATENT DOCUMENTS

| | | | |
|---|---|---|---|
| 5,884,245 A * | 3/1999 | Chandler | ................. G06F 17/18 |
| | | | 702/189 |
| 6,738,450 B1 * | 5/2004 | Barford | ................. G01N 23/044 |
| | | | 378/58 |
| 6,928,396 B2 | 8/2005 | Thackston | |
| 7,149,698 B2 | 12/2006 | Guheen et al. | |
| 7,188,085 B2 | 3/2007 | Pelletier | |
| 7,228,437 B2 | 6/2007 | Spagna et al. | |
| 7,277,870 B2 | 10/2007 | Mourad et al. | |
| 7,383,228 B2 | 6/2008 | Lisanke et al. | |
| 7,440,953 B2 | 10/2008 | Sidman | |
| 7,467,198 B2 | 12/2008 | Goodman et al. | |
| 7,487,128 B2 | 2/2009 | Spagna et al. | |
| 7,590,866 B2 | 9/2009 | Hurtado et al. | |
| 7,594,264 B2 | 9/2009 | Meyers et al. | |
| 7,664,666 B2 | 2/2010 | Barnard et al. | |
| 7,714,729 B2 | 5/2010 | Pape et al. | |
| 7,899,679 B2 | 3/2011 | MacKay et al. | |
| 7,962,413 B2 | 6/2011 | Lisanke et al. | |

(Continued)

*Primary Examiner* — Monica M Pyo

(57) ABSTRACT

A guided sampling tool guides the sampling of datapoints in large datasets. Generally, the guided sampling tool applies a machine learning algorithm to a database of historical issues encountered by an organization to guide the sampling of a large dataset. The guided sampling tool can evaluate and change provided variables and weights for performing a sampling. After the datapoints are sampled, the guided sampling tool compares the historic transactions represented by those datapoints to baseline images to determine if the historic transactions encountered a problem or issue, which would affect the overall quality assessment.

18 Claims, 3 Drawing Sheets

(56) References Cited

U.S. PATENT DOCUMENTS

| | | |
|---|---|---|
| 7,962,750 B1 | 6/2011 | Gruse et al. |
| 8,010,395 B2 | 8/2011 | Barnard et al. |
| 8,180,708 B2 | 5/2012 | Hurtado et al. |
| 8,266,066 B1 | 9/2012 | Wezter et al. |
| 8,275,715 B2 | 9/2012 | Caruso et al. |
| 8,311,863 B1 | 11/2012 | Kemp |
| 8,360,313 B1 | 1/2013 | Leon et al. |
| 8,396,783 B2 | 3/2013 | Henley |
| 8,498,941 B2 | 7/2013 | Felsher |
| 8,508,336 B2 | 8/2013 | Giobbi et al. |
| 8,554,581 B2 | 10/2013 | Roberts et al. |
| 8,566,115 B2 | 10/2013 | Moore |
| 8,642,262 B2 | 2/2014 | Stroman et al. |
| 8,843,877 B2 | 9/2014 | Dutta et al. |
| 8,938,719 B2 | 1/2015 | Anjan et al. |
| 9,063,823 B2 | 6/2015 | Imrey et al. |
| 9,083,581 B1 | 7/2015 | Addepalli et al. |
| 9,189,757 B2 | 11/2015 | Finlayson et al. |
| 9,299,964 B2 | 1/2016 | Stevelinck |
| 10,192,108 B2 | 1/2019 | Nepomniachtchi et al. |
| 10,528,925 B2 | 1/2020 | Roach et al. |
| 2003/0212528 A1* | 11/2003 | Chandler ............... G06F 17/17 702/179 |
| 2006/0122807 A1* | 6/2006 | Wittkowski ........... G06F 17/18 702/179 |
| 2007/0162496 A1* | 7/2007 | Pulfer ................... G06Q 10/06 |
| 2009/0263768 A1* | 10/2009 | Cases .................... G06Q 10/06 434/107 |
| 2009/0299896 A1* | 12/2009 | Zhang .................. G06Q 40/025 705/38 |
| 2012/0159420 A1* | 6/2012 | Yassin ................. G06F 11/3692 717/101 |
| 2013/0211880 A1 | 8/2013 | Kannan et al. |
| 2014/0019318 A1 | 1/2014 | Haberaecker et al. |
| 2014/0089176 A1 | 3/2014 | Walker et al. |
| 2014/0142973 A1 | 5/2014 | Henley |
| 2015/0032752 A1* | 1/2015 | Greifeneder .......... H04L 41/064 707/738 |
| 2016/0371612 A1 | 12/2016 | Bagchi et al. |
| 2018/0373956 A1 | 12/2018 | Yamato |
| 2020/0410403 A1* | 12/2020 | Kamulete .............. G06N 7/005 |

\* cited by examiner

GUIDED SAMPLING FOR IMPROVED QUALITY TESTING

TECHNICAL FIELD

This disclosure relates generally to the sampling of large datasets for quality testing.

BACKGROUND

An organization may perform quality assessments or tests to determine how the organization is performing. To perform these assessments, the organization may sample a large dataset of past transactions and interactions to assess how the organization performed during each sampled transaction or interaction.

SUMMARY OF THE DISCLOSURE

An organization may perform quality assessments or tests to determine how the organization is performing. To perform these assessments, the organization may sample a large dataset of past transactions and interactions to assess how the organization performed during each sampled transaction or interaction. Because the dataset is large, it is not possible to evaluate all datapoints during the quality assessment. Conventionally, the organization's assessment system would randomly sample datapoints from the large dataset and evaluate those datapoints to assess quality. Randomly sampling datapoints, however, may provide an inaccurate analysis of the organization's quality. For example, problems and issues faced by the organization tend to be concentrated on certain geographies, departments, times, and/or individuals. A random sampling of datapoints may result in these problems or issues going undetected.

This disclosure contemplates a guided sampling tool that guides the sampling of datapoints in large datasets. Generally, the guided sampling tool applies a machine learning algorithm to a database of historical issues encountered by an organization to guide the sampling of a large dataset. The guided sampling tool can evaluate and change provided variables and weights for performing a sampling. After the datapoints are sampled, the guided sampling tool compares the historic transactions represented by those datapoints to baseline images to determine if the historic transactions encountered a problem or issue, which would affect the overall quality assessment. In this manner, the guided sampling tool improves the accuracy of the assessment and ensures that problems or issues that are encountered by the organization are sampled, in particular embodiments. Certain embodiments are described below.

According to an embodiment, an apparatus includes a memory and a hardware processor communicatively coupled to the memory. The hardware processor receives, from a user, a first plurality of variables and a first plurality of weights assigned to the plurality of variables, determines, from a log of historic errors, a second plurality of variables, and determines, from a matrix corresponding to the second plurality of variables, a second plurality of weights for the second plurality of variables. The hardware processor also implements changes to the first plurality of variables and the first plurality of weights such that the first plurality of variables matches the second plurality of variables and the first plurality of weights matches the second plurality of weights and retrieves a plurality of historic transactions using a query that applies the second plurality of variables ordered according to the second plurality of weights. The hardware processor further compares a first historic transaction of the plurality of historic transactions with a first baseline image to determine that the first historic transaction is consistent with the first baseline image, compares a second historic transaction of the plurality of historic transactions with a second baseline image to determine that the second historic transaction is inconsistent with the second baseline image, and in response to determining that the second historic transaction is inconsistent with the second baseline image, flags the second historic transaction as erroneous.

According to another embodiment, a method includes receiving, by a hardware processor communicatively coupled to a memory and from a user, a first plurality of variables and a first plurality of weights assigned to the plurality of variables, determining, by the hardware processor and from a log of historic errors, a second plurality of variables, and determining, by the hardware processor and from a matrix corresponding to the second plurality of variables, a second plurality of weights for the second plurality of variables. The method also includes implementing, by the hardware processor, changes to the first plurality of variables and the first plurality of weights such that the first plurality of variables matches the second plurality of variables and the first plurality of weights matches the second plurality of weights and retrieving, by the hardware processor, a plurality of historic transactions using a query that applies the second plurality of variables ordered according to the second plurality of weights. The method further includes comparing, by the hardware processor, a first historic transaction of the plurality of historic transactions with a first baseline image to determine that the first historic transaction is consistent with the first baseline image, comparing, by the hardware processor, a second historic transaction of the plurality of historic transactions with a second baseline image to determine that the second historic transaction is inconsistent with the second baseline image, and in response to determining that the second historic transaction is inconsistent with the second baseline image, flagging, by the hardware processor, the second historic transaction as erroneous.

According to another embodiment, a system includes a database and a guided sampling tool. The guided sampling tool includes a memory and a hardware processor communicatively coupled to the memory. The hardware processor receives, from a user, a first plurality of variables and a first plurality of weights assigned to the plurality of variables, determines, from a log of historic errors, a second plurality of variables, and determines, from a matrix corresponding to the second plurality of variables, a second plurality of weights for the second plurality of variables. The hardware processor also implements changes to the first plurality of variables and the first plurality of weights such that the first plurality of variables matches the second plurality of variables and the first plurality of weights matches the second plurality of weights and retrieves, from the database, a plurality of historic transactions using a query that applies the second plurality of variables ordered according to the second plurality of weights. The hardware processor further compares a first historic transaction of the plurality of historic transactions with a first baseline image to determine that the first historic transaction is consistent with the first baseline image, compares a second historic transaction of the plurality of historic transactions with a second baseline image to determine that the second historic transaction is inconsistent with the second baseline image, and in response to determining that the second historic transaction is inconsistent with the second baseline image, flags the second historic transaction as erroneous.

Certain embodiments provide one or more technical advantages. For example, an embodiment improves the accuracy of an assessment over an assessment done using random sampling. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
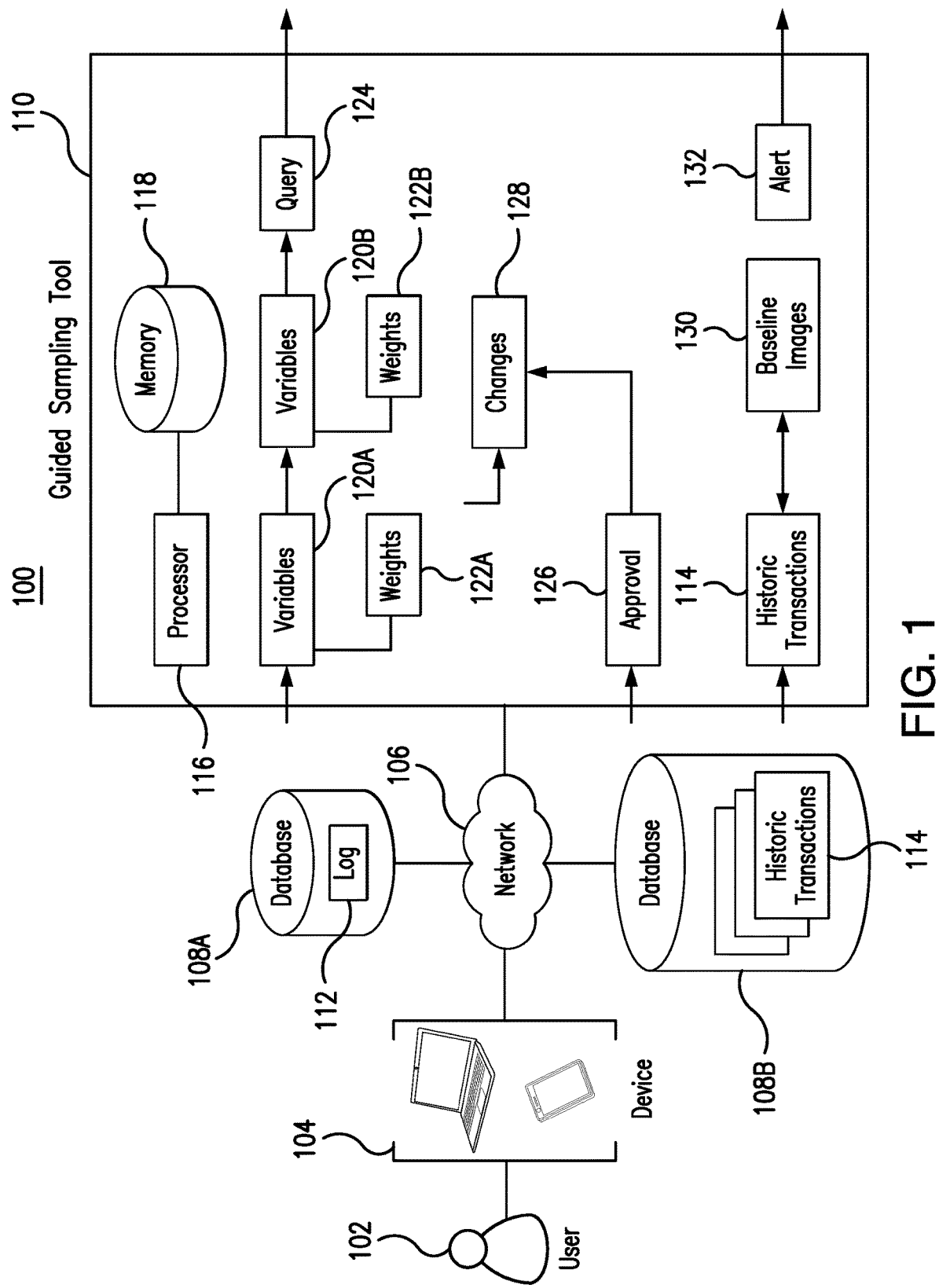
FIG. 1 illustrates an example system.
Figure 2:
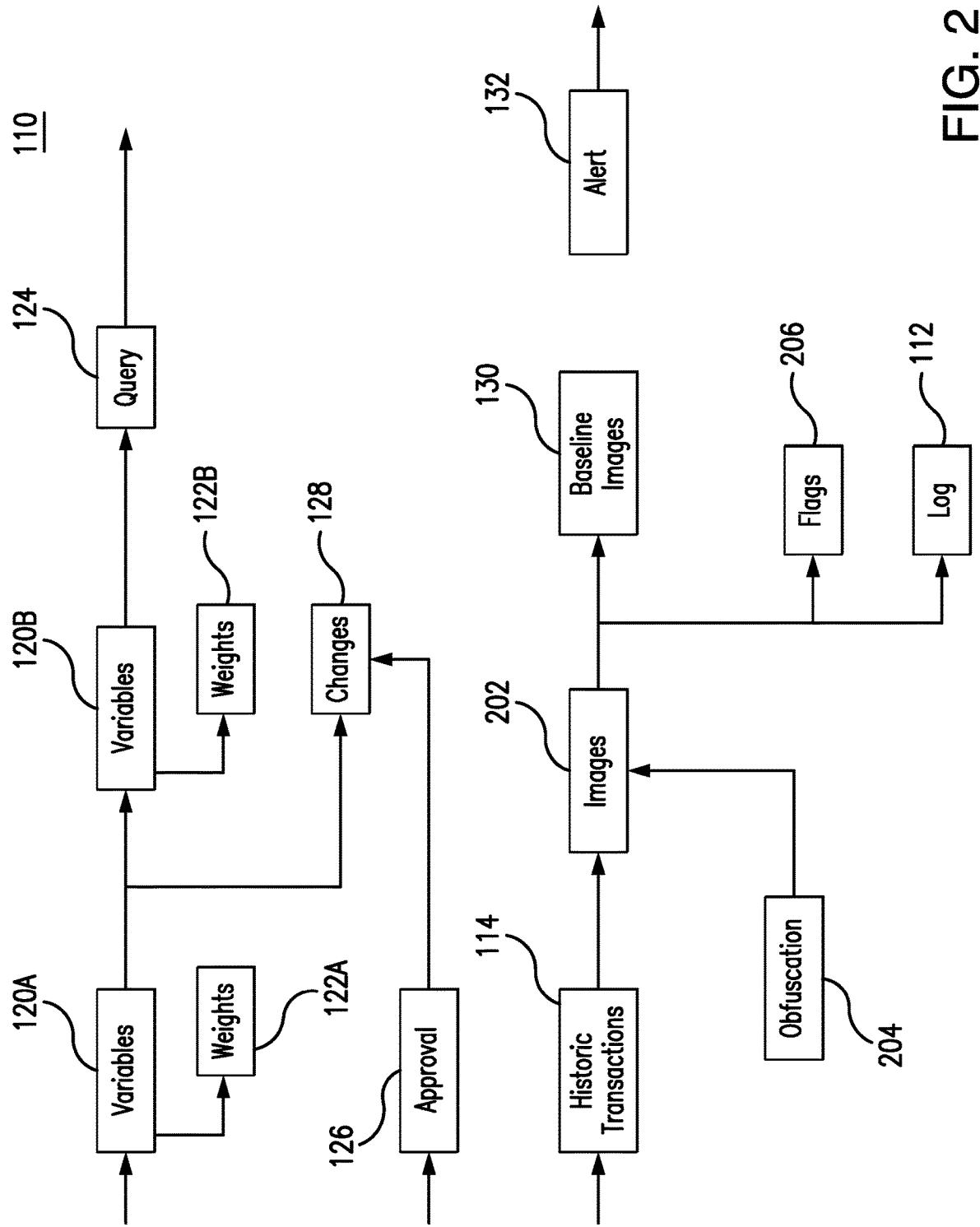
FIG. 2 illustrates an example guided sampling tool in the system of FIG. 1.
Figure 3:
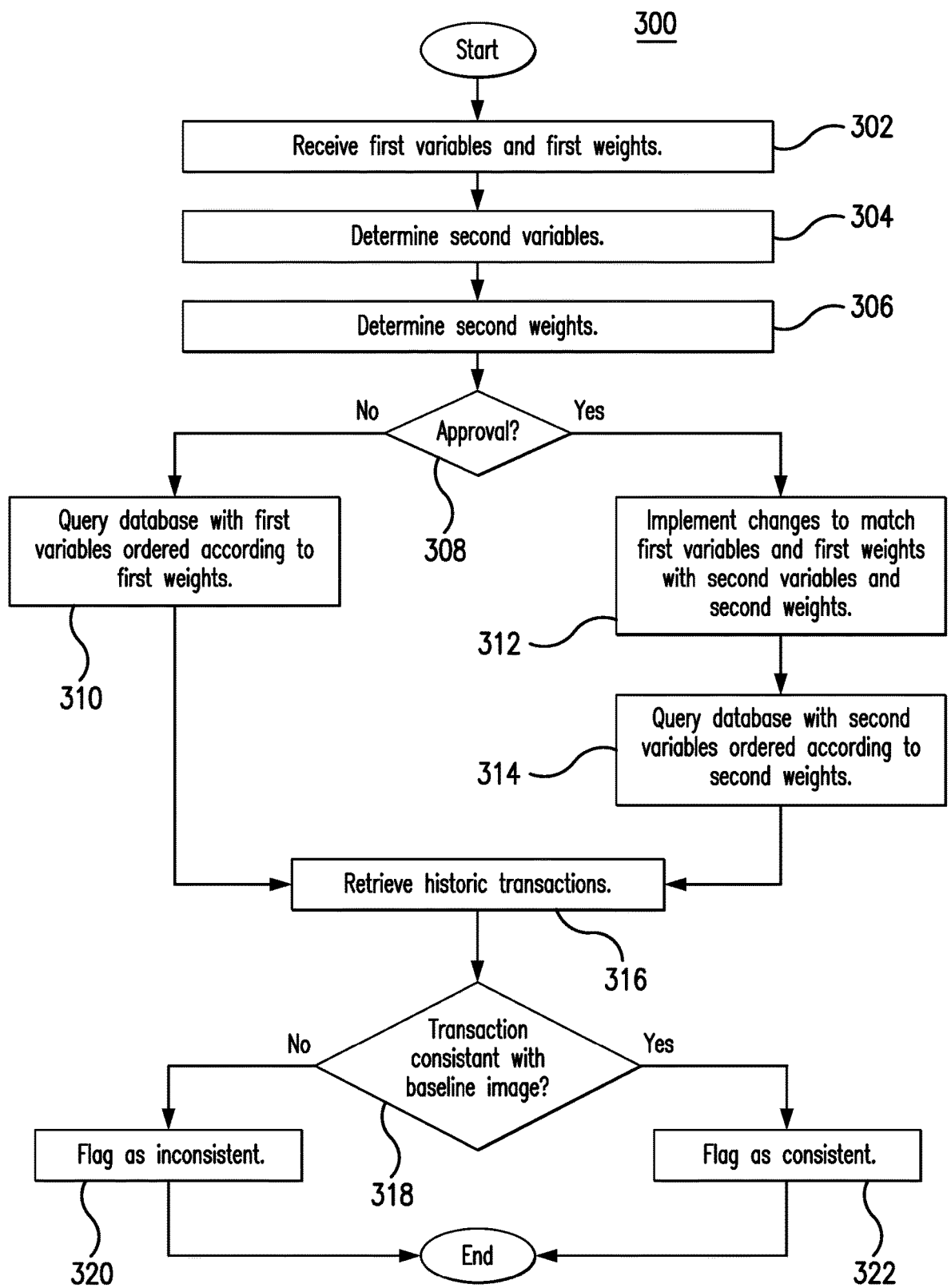
FIG. 3 is a flowchart illustrating a method of guided sampling using the system of FIG. 1.

Embodiments of the present disclosure and its advantages are best understood by referring to FIGS. 1 through 3 of the drawings, like numerals being used for like and corresponding parts of the various drawings.

An organization may perform quality assessments or tests to determine how the organization is performing. To perform these assessments, the organization may sample a large dataset of past transactions and interactions to assess how the organization performed during each sampled transaction or interaction. Because the dataset is large, it is not possible to evaluate all datapoints during the quality assessment. Conventionally, the organization's assessment system would randomly sample datapoints from the large dataset and evaluate those datapoints to assess quality. Randomly sampling datapoints, however, may provide an inaccurate analysis of the organization's quality. For example, problems and issues faced by the organization tend to be concentrated on certain geographies, departments, times, and/or individuals. A random sampling of datapoints may result in these problems or issues going undetected.

This disclosure contemplates a guided sampling tool that guides the sampling of datapoints in large datasets. Generally, the guided sampling tool applies a machine learning algorithm to a database of historical issues encountered by an organization to guide the sampling of a large dataset. The guided sampling tool can evaluate and change provided variables and weights for performing a sampling. After the datapoints are sampled, the guided sampling tool compares the historic transactions represented by those datapoints to baseline images to determine if the historic transactions encountered a problem or issue, which would affect the overall quality assessment. In this manner, the guided sampling tool improves the accuracy of the assessment and ensures that problems or issues that are encountered by the organization are sampled, in particular embodiments.

A practical application of the guided sampling tool is that the tool improves the accuracy of a quality assessment over a quality assessment that is performed using random sampling in some embodiments. The tool may ensure that problems and issues encountered by an organization do not go undetected. The system will be described in more detail using FIGS. 1 through 3.

FIG. 1 illustrates an example system 100. As seen in FIG. 1, system 100 includes one or more devices 104, a network 106, one or more databases 108, and a guided sampling tool 110. Generally, system 100 assists in the sampling of large datasets. In particular embodiments, system 100 improves the accuracy and quality of quality assessments performed through the sampling of large datasets by directing the sampling towards erroneous and/or problematic data points.

User 102 uses devices 104 to communicate with other components of system 100. For example, user 102 may be an administrator performing a quality assessment using device 104. User 102 may user device 104 to initiate and perform the quality assessment. For example, user 102 may use device 104 to set variables and weights for the sampling of datapoints during the quality assessment. As another example, device 104 may receive variables and weights from other components of system 100 such as, for example, guided sampling tool 110. Device 104 may also receive the results of the quality assessment which may include flags and alerts of problematic or erroneous data points.

Devices 104 include any appropriate device for communicating with components of system 100 over network 106. For example, devices 104 may be a telephone, a mobile phone, a computer, a laptop, a tablet, an automated assistant, and/or a cash register. This disclosure contemplates device 104 being any appropriate device for sending and receiving communications over network 106. As an example and not by way of limitation, device 104 may be a computer, a laptop, a wireless or cellular telephone, an electronic notebook, a personal digital assistant, a tablet, or any other device capable of receiving, processing, storing, and/or communicating information with other components of system 100. Device 104 may also include a user interface, such as a display, a microphone, keypad, or other appropriate terminal equipment usable by user 102. Device 104 may include a hardware processor, memory, and/or circuitry configured to perform any of the functions or actions of device 104 described herein. For example, a software application designed using software code may be stored in the memory and executed by the processor to perform the functions of device 104.

Network 106 allows communication between and amongst the various components of system 100. For example, user 102 may use devices 104 to communicate over network 106. This disclosure contemplates network 106 being any suitable network operable to facilitate communication between the components of system 100. Network 106 may include any interconnecting system capable of transmitting audio, video, signals, data, messages, or any combination of the preceding. Network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

System 100 includes one or more databases 108 that store information used by other components of system 100. In the example of FIG. 1, system 100 includes a database 108A and a database 108B. System 100 may include any suitable number of databases 108. For example, system 100 may include a single database 108 that stores both log 112 and historic transactions 114. Database 108A stores a log 112. Log 112 may include information pertaining to the historic performance of an organization. For example, log 112 may store reports indicating past errors, issues, or problems caused or encountered by the organization. As another example, log 112 may store reports showing previous bugs, errors, or mistakes encountered by the organization. A review of log 112 may reveal problematic areas within the organization cross time.

Database 108B stores historic transactions 114. Historic transactions 114 may be all the transactions that the organization has conducted over a period of time. These transactions 114 may have been completed successfully or they may have encountered a mistake, bug, or error. System 100 may search and review a set of historic transactions 114 to assess the quality of the organization's performance. The number of historic transactions 114 stored in database 108B may be large. As a result, it may not be possible to assess and review each historic transaction 114 stored in database 108B to perform the quality assessment. In conventional systems, quality assessment is done by randomly sampling historic transactions 114 and assessing the sampled transactions. Random sampling, however, may lead to inaccurate results.

For example, problems and errors encountered by an organization tend to be concentrated on certain geographies, departments, times, and/or individuals. In other words, the problems and issues faced by an organization tend not to be randomly distributed across historic transactions 114. As a result, a random sampling of historic transactions 114 may result in the problems and/or issues being underrepresented or overrepresented in the quality assessment.

Guided sampling tool 110 guides the sampling of historic transactions 114 during a quality assessment. In particular embodiments, the guided sampling of historic transactions 114 improves the accuracy of quality assessment. In the example of FIG. 1, guided sampling tool 110 includes a processor 116 and a memory 118. Processor 116 and memory 118 may be configured to perform any of the actions and functions of guided sampling tool 110 described herein.

Processor 116 is any electronic circuitry, including, but not limited to microprocessors, application specific integrated circuits (ASIC), application specific instruction set processor (ASIP), and/or state machines, that communicatively couples to memory 118 and controls the operation of guided sampling tool 110. Processor 116 may be 8-bit, 16-bit, 32-bit, 64-bit or of any other suitable architecture. Processor 116 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 116 may include other hardware that operates software to control and process information. Processor 116 executes software stored on memory to perform any of the functions described herein. Processor 116 controls the operation and administration of guided sampling tool 110 by processing information received from devices 104, network 106, and memory 118. Processor 116 may be a programmable logic device, a microcontroller, a microprocessor, any suitable processing device, or any suitable combination of the preceding. Processor 116 is not limited to a single processing device and may encompass multiple processing devices.

Memory 118 may store, either permanently or temporarily, data, operational software, or other information for processor 116. Memory 118 may include any one or a combination of volatile or non-volatile local or remote devices suitable for storing information. For example, memory 118 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 118, a disk, a CD, or a flash drive. In particular embodiments, the software may include an application executable by processor 116 to perform one or more of the functions described herein.

Guided sampling tool 110 receives variables 120A and weights 122A. Variables 120A and weights 122A may have been communicated by a user 102 using a device 104. User 102 may have selected variables 120A and assigned weights 122A to those variables 120A. User 102 may have intended variables 120A to be used to search historic transactions 114. Variables 120A may represent particular characteristics of historic transactions 114 to be searched such as, for example, geography, department, times, and/or individuals. User 102 may set values to these variables 120A that are intended to be used to search historic transactions 114. For example, if user 102 sets a geography variable to the value "North America," then user 102 intends a search for historic transactions 114 that occurred in North America. As another example, if user 102 sets a department variable 120A to the value "software development," then user 102 intends to search historic transactions 114 involving the software development department.

User 102 may assign weights 122A to variables 120A. Weights 122A may indicate the importance of particular variables 120A in the search of historic transactions 114. Guided sampling tool 110 may perform a search according to an ordering of variables 120 based on weights 122. For example, the higher the weight 122 that is assigned to a variable 120, the higher in a hierarchical search a particular variable 120 is. Using the previous example, if the weight 122 assigned to the geographic variable is higher than the weight 122 assigned to the department variable, then guided sampling tool may first search for historic transactions 114 that occurred in North America and then from those search results, search for the historic transactions 114 involving the software development department. By using variables 120 and weights 122, user 102 may set parameters around the search and/or sampling of historic transactions 114.

Guided sampling tool 110 may analyze variables 120A and weights 122A to assess whether user 102 has chosen the correct variables 120A and weights 122A that maximize or optimize the accuracy of the quality assessment. Guided sampling tool 110 may apply a machine learning algorithm on log 112 and on variables 120A and weights 122A to determine the variables 120B and weights 122B that should be used to sample historic transactions 114. The machine learning algorithm may assess log 112 to determine the variables 120 that will target certain portions of the organization that have historically encountered problems, errors, and/or mistakes. For example, if log 112 shows that a certain department in a certain geography encounters errors, problems, and/or mistakes on certain days of the week, then guided sampling tool 110 may propose variables 120 that target that geography, department, and/or day of the week. Guided sampling tool 110 may also determine weights 122B that should be assigned to variables 120B to perform an optimal sampling of historic transactions 114. In this manner, guided sampling tool 110 determines variables 120B and weights 122B that can be used to perform an accurate assessment of historic transactions 114.

Guided sampling tool 110 may determine the differences between variables 120A and variables 120B and the differences between weights 122A and weights 122B. Changes 128 may reflect the changes that should be made or implemented to variables 120A and weights 122A so that they match variables 120B and weights 122B. As a result, changes 128 represent the differences between the variables 120A and weights 122A suggested by user 102 and the variables 120B and weights 122B suggested by guided sampling tool 110. Guided sampling tool 110 may implement changes 128 to convert variables 120A and weights 122A to variables 120B and weights 122B.

In particular embodiments, guided sampling tool 110 may request approval from user 102 before initiating a search of historic transactions 114 using variables 120B and/or weights 122B. If user 102 agrees with guided sampling tool 110, user 102 may provide approval 126 to guided sampling tool 110. When guided sampling tool 110 receives approval 126, guided sampling tool 110 may approve changes 128 and implement changes 128. By implementing changes 128, guided sampling tool 110 changes variables 120A and weights 122A to match variables 120B and weights 122B. In certain embodiments, if approval 126 is not provided, then guided sampling tool 110 may proceed with variables 120A and weights 122A.

Guided sampling tool 110 generates a query 124 using variables 120A and weights 122A or variables 120B and weights 122B, depending on whether approval 126 is provided in certain embodiments. In certain embodiments where approval 126 is not required, guided sampling tool 110 generates query 124 based on variables 120B and weights 122B. Guided sampling tool 110 communicates query 124 to database 108B to search and/or sample historic transactions 114. Database 108B may return the historic transactions 114 according to the variables 120 and weights 122 indicated by query 124.

Guided sampling tool 110 receives historic transactions 114 returned in response to query 124. The received historic transactions 114 may be a subset of the historic transactions 114 stored in database 108B. Guided sampling tool 110 may then perform the quality assessment based on the return historic transactions 114. For example, guided sampling tool 110 may compare historic transactions 114 with baseline images 130. The comparison may reveal which historic transactions 114 were problematic and/or erroneous. For example, if a historic transaction 114 matches and/or is consistent with its baseline image 130, then guided sampling tool 110 may determine that that historic transaction 114 was successfully performed. On the other hand, if a historic transaction 114 does not match or is inconsistent with its baseline image 130, then guided sampling tool 110 may determine that that historic transaction 114 encountered an error, problem, or mistake.

If guided sampling tool 110 determines that a historic transaction 114 encountered an error, problem, or mistake, guided sampling tool 110 may generate and communicate an alert 132 indicating that that historic transaction 114 encountered an error, problem, or mistake. The alert 132 may be communicated to user 102 or device 104. Alert 132 may indicate multiple historic transactions 114 that encountered errors, problems, or mistakes. Guided sampling tool 110 may also provide a quality assessment of the organization in alert 132 based on the number of historic transactions 114 that encountered an error, problem, or mistake.

FIG. 2 illustrates an example guided sampling tool 110 in the system 100 of FIG. 1. Generally, guided sampling tool 110 assists in the sampling of a large set of historic transactions 114 to perform a quality assessment of an organization. In particular embodiments, guided sampling tool 110 improves the accuracy of the quality assessment by performing a guided sampling rather than a random sampling of historic transactions 114.

Guided sampling tool 110 receives variables 120A and weights 122A from a device 104. Variables 120A and weights 122A may have been provided by a user 102 designed to initiate or perform a quality assessment. By sending variables 120A and weights 122A, the user 102 may be instructing guided sampling tool 110 to search historic transactions 114 using the provided variables 120A and weights 122A. The provided variables 120A and weights 122A; however, may not result in an accurate quality assessment. Guided sampling tool 110 may apply a machine learning algorithm to various sources of information to determine changes 128 to be made to variables 120A and weights 122A that would improve the accuracy of the quality assessment.

Guided sampling tool 110 may apply the machine learning algorithm on log 112 which includes information about past mistakes or errors encountered by the organization. The machine learning algorithm may determine the variables 120 that appear to influence whether a mistake or error occurs. Guided sampling tool 110 may also apply the machine learning algorithm on a matrix 201 that stores weights 122 for certain variables 120. The weights 122 in matrix 201 may be tuned by the machine learning algorithm based on the information in log 112 to reflect the weights 122 for variables 120 that optimize the accuracy of a quality assessment. As the information in log 112 is updated, the weights in matrix 201 may be adjusted by the machine learning algorithm. In particular embodiments the machine learning algorithm may implement an attention network to consider information from these different sources in determining changes 128. The machine learning algorithm may determine the appropriate variables 120B for performing the quality assessment based on information in log 112 and the appropriate weights 122B for performing the quality assessment using matrix 201.

Guided sampling tool 110 determines changes 128 to variables 120A and weights 122A based on information in log 112 and matrix 201. Guided sampling tool 110 may apply changes 128 to variables 120A and weights 122A to form variables 120B and weights 122B. In particular embodiments, guided sampling tool 110 may seek approval 126 from user 102 or device 104 before implementing changes 128 on variables 120A and weights 122A. If approval 126 is not provided guided sampling tool 110 may perform the quality assessment using variables 120A and weights 122A. If approval 126 is provided guided sampling tool 110 implements changes 128 and performs the quality assessment using variables 120B and weights 122B.

Guided sampling tool 110 may generate a query 124 based on variables 120 and weights 122. In embodiments where approval 126 is required, guided sampling tool 110 may form query 124 using variables 120A and weights 122A if approval 126 was not provided and variables 120B and weights 122B if approval 126 was provided. Guided sampling tool 110 communicates query 124 to database 108B to search or sample historic transactions 114.

Guided sampling tool 110 receives historic transactions 114 from database 108B based on the communicated query 124. The received historic transactions 114 may be a subset of the historic transactions 114 stored in database 108B. The returned historic transactions 114 may provide a more accurate quality assessment of an organization in certain embodiments because the query 124 may be formed using variables 120B and weights 122B determine using the machine learning algorithm.

Guided sampling tool 110 may then perform the quality assessment by comparing historic transactions 114 to baseline images 130. In particular embodiments, guided sampling tool 110 may convert historic transactions 114 to images 202 that reflect the historic transactions 114. Guided sampling tool 110 then compares images 202 to baseline images 130 to determine if images 202 match or are consistent with baseline images 130. In certain embodiments, guided sampling tool 110 may determine an obfuscation 204 that should be applied to historic transactions 114 and/or images 202 before comparing with baseline images 130. For example, guided sampling tool 110 may determine that historic transactions 114 and/or images 202 include sensitive or private information about an individual (e.g., a name, an address, a social security number, etc.). Guided sampling tool 110 may determine that this information should be hidden from view. In response, guided sampling tool 110 determines an obfuscation 204 that should be applied to historic transactions 114 and/or images 202 to hide this information. Guided sampling tool 110 may then apply obfuscation 204 to images 202 or historic transactions 114 to hide this information.

By comparing images 202 to baseline images 130, guided sampling tool 110 may determine the historic transactions 114 that are problematic or erroneous. If a historic transaction 114 or image 202 does not match or is inconsistent with baseline image 130, guided sampling tool 110 may generate a flag 206 for that historic transaction 114 or image 202. Flag 206 may indicate that the historic transaction 114 or image 202 is problematic or erroneous. In certain embodiments, guided sampling tool 110 may add the historic transaction 114 or image 202 to log 112 to report that the historic transaction 114 or image 202 is problematic or erroneous. In this manner, future determinations of variables 120 or weights 122 may reflect the detected problematic historic transaction 114. In some embodiments, guided sampling tool 110 may generate flag 206 for a historic transaction 114 and/or image 202 that is not problematic or erroneous. The flag 206 may indicate that the historic transaction 114 or image 202 passed the quality assessment.

Guided sampling tool 110 may generate and communicate an alert 132 that indicates the problematic or erroneous historic transaction 114 or image 202. By viewing alert 132, a user 102 or device 104 may determine the problematic or erroneous historic transactions 114 and the overall quality assessment of the organization.

FIG. 3 is a flow chart illustrating a method 300 of guided sampling using the system 100 of FIG. 1. Generally, guided sampling tool 110 performs the steps of method 300. In particular embodiments, by performing method 300, guided sampling tool 110 improves the accuracy of a quality assessment over a quality assessment performed using random sampling.

Guided sampling tool 110 begins by receiving first variables 120A and first weights 122A in step 302. First variables 120A and first weights 122A may have been provided by a user 102 or a device 104 to initiate a quality assessment. In step 304, guided sampling tool 110 determines second variables 120B. In certain embodiments guided sampling tool 110 may determine second variables 120B by applying a machine learning algorithm on information in a log 112 showing historic problems or errors encountered by an organization. In this manner, the machine learning algorithm may determine the variables 120B that target the problematic or erroneous portions of the organization. In step 306, guided sampling tool 110 determines the second weights 122B. In certain embodiments, guided sampling tool 110 determines second weights 122B by applying the machine learning algorithm to a matrix 201 of variables 120 and weights 122. The matrix 201 may indicate the appropriate weights 122 that should act as the second weights 122B.

In step 308, guided sampling tool 110 determines whether approval 126 has been provided to use second variables 120B and second weights 122B. If approval 126 is not provided, guided sampling tool 110 queries a database 108B with first variables 120A ordered according to first weights 122A in step 310. If approval 126 is provided, guided sampling tool 110 implements changes 128 to match first variables 120A and first weights 122A with second variables 120B and second weights 122B in step 312. Then, in step 314 guided sampling tool 110 queries the database 108B with second variables 120B ordered according to second weights 122B.

In step 316, guided sampling tool 110 retrieves historic transactions 114 based on the query communicated to database 108B. Guided sampling tool 110 then determines whether the transactions 114 are consistent with a baseline image 130. In particular embodiments, guided sampling tool 110 may determine that a historic transaction 114 is consistent with a baseline image 130 by determining whether the historic transaction 114 matches the baseline image 130. In some embodiments, guided sampling tool 110 may convert the historic transaction 114 into an image 202 and compare that image 202 to baseline image 130 to determine whether the transaction 114 is consistent with the baseline image 130. If the historic transaction 114 is not consistent with the baseline image 130, guided sampling tool 110 may flag the historic transaction 114 as inconsistent in step 320. If the historic transaction 114 is consistent with the baseline image 130, guided sampling tool 110 may flag the historic transaction 114 as consistent in step 322.

Modifications, additions, or omissions may be made to methods 300 and 320 depicted in FIG. 3. Methods 300 and 320 may include more, fewer, or other steps. For example, steps may be performed in parallel or in any suitable order. While discussed as particular components of system 100 performing the steps, any suitable component of system 100 may perform one or more steps of the methods.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
   a memory; and
   a hardware processor communicatively coupled to the memory, the hardware processor configured to:
   receive, from a user, a first plurality of variables and a first plurality of weights assigned to the plurality of variables;
   determine, from a log of historic errors, a second plurality of variables;
   determine, from a matrix corresponding to the second plurality of variables, a second plurality of weights for the second plurality of variables;

implement changes to the first plurality of variables and the first plurality of weights such that the first plurality of variables matches the second plurality of variables and the first plurality of weights matches the second plurality of weights;

retrieve a plurality of historic transactions using a query that applies the second plurality of variables ordered according to the second plurality of weights, wherein the plurality of historic transactions comprises at least a portion of an organizational dataset;

compare a first historic transaction of the plurality of historic transactions with a first baseline image to determine that the first historic transaction is consistent with the first baseline image;

compare a second historic transaction of the plurality of historic transactions with a second baseline image to determine that the second historic transaction is inconsistent with the second baseline image;

in response to determining that the second historic transaction is inconsistent with the second baseline image, flag the second historic transaction as erroneous; and add the second historic transaction to the log of historic errors in response to determining that the second historic transaction is inconsistent with the second baseline image, wherein adding the second historic transaction to the log of historic errors improves accuracy of future assessments of the organizational dataset.

2. The apparatus of claim 1, the hardware processor further configured to receive approval for the changes from the user before implementing the changes.

3. The apparatus of claim 1, the hardware processor further configured to:
determine that a variable of the second plurality of variables should be obfuscated; and
in response to determining that the variable should be obfuscated, remove a value of the variable from each historic transaction of the plurality of historic transactions.

4. The apparatus of claim 1, the hardware processor further configured to communicate an alert that the second historic transaction is inconsistent with the second baseline image.

5. The apparatus of claim 1, the hardware processor further configured to generate an image based on the second historic transaction, wherein comparing the second historic transaction with the second baseline image comprises comparing the image with the second baseline image.

6. The apparatus of claim 1, the hardware processor further configured to flag the first historic transaction as correct in response to determining that the first historic transaction is consistent with the first baseline image.

7. A method comprising:
receiving, by a hardware processor communicatively coupled to a memory and from a user, a first plurality of variables and a first plurality of weights assigned to the plurality of variables;
determining, by the hardware processor and from a log of historic errors, a second plurality of variables;
determining, by the hardware processor and from a matrix corresponding to the second plurality of variables, a second plurality of weights for the second plurality of variables;
implementing, by the hardware processor, changes to the first plurality of variables and the first plurality of weights such that the first plurality of variables matches the second plurality of variables and the first plurality of weights matches the second plurality of weights;

retrieving, by the hardware processor, a plurality of historic transactions using a query that applies the second plurality of variables ordered according to the second plurality of weights, wherein the plurality of historic transactions comprises at least a portion of an organizational dataset;

comparing, by the hardware processor, a first historic transaction of the plurality of historic transactions with a first baseline image to determine that the first historic transaction is consistent with the first baseline image;

comparing, by the hardware processor, a second historic transaction of the plurality of historic transactions with a second baseline image to determine that the second historic transaction is inconsistent with the second baseline image;

in response to determining that the second historic transaction is inconsistent with the second baseline image, flagging, by the hardware processor, the second historic transaction as erroneous; and adding the second historic transaction to the log of historic errors in response to determining that the second historic transaction is inconsistent with the second baseline image, wherein adding the second historic transaction to the log of historic errors improves accuracy of future assessments of the organizational dataset.

8. The method of claim 7, further comprising receiving, by the hardware processor, approval for the changes from the user before implementing the changes.

9. The method of claim 7, further comprising:
determining, by the hardware processor, that a variable of the second plurality of variables should be obfuscated; and
in response to determining that the variable should be obfuscated, removing, by the hardware processor, a value of the variable from each historic transaction of the plurality of historic transactions.

10. The method of claim 7, further comprising communicating, by the hardware processor, an alert that the second historic transaction is inconsistent with the second baseline image.

11. The method of claim 7, further comprising generating, by the hardware processor, an image based on the second historic transaction, wherein comparing the second historic transaction with the second baseline image comprises comparing the image with the second baseline image.

12. The method of claim 7, further comprising flagging, by the hardware processor, the first historic transaction as correct in response to determining that the first historic transaction is consistent with the first baseline image.

13. A system comprising:
a first database that stores a log of historic errors;
a second database that stores a plurality of historic transactions; and
a guided sampling tool comprising a memory and a hardware processor communicatively coupled to the memory, the hardware processor configured to:
receive, from a user, a first plurality of variables and a first plurality of weights assigned to the plurality of variables;
determine, from the log of historic errors, a second plurality of variables;
determine, from a matrix corresponding to the second plurality of variables, a second plurality of weights for the second plurality of variables;

implement changes to the first plurality of variables and the first plurality of weights such that the first plurality of variables matches the second plurality of variables and the first plurality of weights matches the second plurality of weights;

retrieve, from the second database, the plurality of historic transactions using a query that applies the second plurality of variables ordered according to the second plurality of weights, wherein the plurality of historic transactions comprises at least a portion of an organizational dataset;

compare a first historic transaction of the plurality of historic transactions with a first baseline image to determine that the first historic transaction is consistent with the first baseline image;

compare a second historic transaction of the plurality of historic transactions with a second baseline image to determine that the second historic transaction is inconsistent with the second baseline image;

in response to determining that the second historic transaction is inconsistent with the second baseline image, flag the second historic transaction as erroneous; and add the second historic transaction to the log of historic errors in response to determining that the second historic transaction is inconsistent with the second baseline image, wherein adding the second historic transaction to the log of historic errors improves accuracy of future assessments of the organizational dataset.

14. The system of claim 13, the hardware processor further configured to receive approval for the changes from the user before implementing the changes.

15. The system of claim 13, the hardware processor further configured to:
determine that a variable of the second plurality of variables should be obfuscated; and
in response to determining that the variable should be obfuscated, remove a value of the variable from each historic transaction of the plurality of historic transactions.

16. The system of claim 13, the hardware processor further configured to communicate an alert that the second historic transaction is inconsistent with the second baseline image.

17. The system of claim 13, the hardware processor further configured to generate an image based on the second historic transaction, wherein comparing the second historic transaction with the second baseline image comprises comparing the image with the second baseline image.

18. The system of claim 13, the hardware processor further configured to flag the first historic transaction as correct in response to determining that the first historic transaction is consistent with the first baseline image.

* * * * *